United States Patent
Hegde et al.

(10) Patent No.: US 12,503,167 B1
(45) Date of Patent: Dec. 23, 2025

(54) VEHICLE FRAME DESIGNED FOR HIGH VOLTAGE COMPONENT PROTECTION IN FRONTAL IMPACTS

(71) Applicant: FCA US LLC, Auburn Hills, MI (US)

(72) Inventors: Krishnamurthy Hegde, Auburn Hills, MI (US); Kalid S. Jaboo, Auburn Hills, MI (US); Kedar V. Panday, Auburn Hills, MI (US); Santosh Pethe, Auburn Hills, MI (US); Gursharn Sanghera, Auburn Hills, MI (US); Scott Mcguire, Auburn Hills, MI (US); Aravind Srinivasan, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/066,745

(22) Filed: Feb. 28, 2025

(51) Int. Cl.
  *B62D 21/15* (2006.01)
  *B60K 1/00* (2006.01)

(52) U.S. Cl.
  CPC .............. *B62D 21/152* (2013.01); *B60K 1/00* (2013.01)

(58) Field of Classification Search
  CPC ......... B62D 21/152; B62D 21/00; B60K 1/00
  See application file for complete search history.

(56) References Cited

U.S. PATENT DOCUMENTS

| | | | |
|---|---|---|---|
| 7,097,235 B2 * | 8/2006 | Yasukouchi | B62D 21/152 296/187.03 |
| 8,936,276 B1 * | 1/2015 | Vyas | B62D 25/082 180/274 |

OTHER PUBLICATIONS

U.S. Appl. No. 18/886,397, filed Sep. 16, 2024, Kedar Panday, et al.
U.S. Appl. No. 18/971,987, filed Dec. 6, 2024, Kedar V. Panday, et al.

* cited by examiner

*Primary Examiner* — Jason D Shanske
*Assistant Examiner* — Matthew James O'Neill
(74) *Attorney, Agent, or Firm* — Jeremy J. Klobucar

(57) ABSTRACT

A vehicle including a frame that includes first and second longitudinally extending rails that each include an inner panel attached to an outer panel, a plurality of bulkheads positioned within each of the first and second longitudinally extending rails between the inner panel and the outer panel, and a first bead pattern that limits deformation of the rail during a frontal impact to the vehicle. During the frontal impact, the locations of the plurality of bulkheads relative to the first bead pattern cause each of the first and second longitudinally extending rails to deform in a controlled manner that maintains a distance between the first and second longitudinally extending rails and a high-voltage component.

11 Claims, 13 Drawing Sheets

VEHICLE FRAME DESIGNED FOR HIGH VOLTAGE COMPONENT PROTECTION IN FRONTAL IMPACTS

FIELD

The present disclosure relates to a vehicle frame designed for protecting high voltage components during frontal impacts.

BACKGROUND

This section provides background information related to the present disclosure which is not necessarily prior art.

Vehicles with battery-powered electric drivetrains are becoming increasingly more common, and are undergoing substantial research and development. One challenge being faced during the development of battery-powered electric vehicles (BEV) is that the battery is typically packaged under a floor of the vehicle due to its large size, and electric drive motor critical high-voltage components responsible for operation of the vehicle are typically packaged under a hood of the vehicle, which exposes the high-voltage components to a danger of being damaged in the event that the vehicle experiences a frontal collision. This is undesirable from the standpoint that any damage to a high-voltage component can cause a short in the electric system that can result in loss of high-voltage isolation and prevent shutdown of the battery. Accordingly, it is important that the integrity of the high-voltage components be maintained.

Past attempts to protect the integrity of the high-voltage components included packaging the high-voltage components at locations of the vehicle that provided protection to the high-voltage components, or increasing the complexity of the front-end structure of the vehicle. Oftentimes, however, these locations were difficult to access and made it difficult to service the high-voltage components. Moreover, these hard-to-reach locations increased the complexity of routing high-voltage cables that connected the high-voltage components with the battery pack and other electronic features of the vehicle, and repackaging these components in hard-to-reach locations can lead to increased dimensions of the vehicle or potentially require altering the appearance of the vehicle.

In view of the above, it is desirable to be able to package various high-voltage components under the hood of the vehicle in easy-to-reach locations, while still being able to protect the high-voltage components from potentially being damaged if the vehicle is involved in a frontal collision.

SUMMARY

This section provides a general summary of the disclosure, and is not a comprehensive disclosure of its full scope or all of its features.

According to an aspect of the present disclosure, there is provided a vehicle that may include a frame supporting an electric drive motor; and a high-voltage component attached to a forward end and upper surface of the electric drive motor, wherein the frame includes a first longitudinally extending rail and a second longitudinally extending rail, each of the first and second longitudinally extending rails including an inner panel attached to an outer panel; a plurality of bulkheads are positioned within each of the first and second longitudinally extending rails between the inner panel and the outer panel; the inner panels of each of first and second longitudinally extending rails each include a first bead pattern that limits deformation of the respective rail during a frontal impact to the vehicle, each of the first bead patterns including a longitudinally extending bead, a first vertically extending bead connected to the longitudinally extending bead, a second vertically extending bead connected to the longitudinally extending bead, and a third vertically extending bead connected to the longitudinally extending bead; the plurality of bulkheads includes a first bulkhead positioned between the inner panel and the outer panel at a location positioned forward of first vertically extending bead, a second bulkhead positioned between the inner and outer panel at a location positioned between the first and second vertically extending beads, and a third bulkhead positioned between the inner panel and the outer panel at a location positioned aft of the third vertically extending bead; and during a frontal collision event, the locations of the plurality of bulkheads relative to the first, second, and third vertically extending beads cause each of the first and second longitudinally extending rails to deform in a controlled manner that maintains a distance between the first and second longitudinally extending rails and the high-voltage component.

According to the aspect, each of the first and second longitudinally extending rails includes a reinforcement baffle positioned between the inner panel and the outer panel at a location positioned between the first and second vertically extending beads and proximate the second bulkhead.

According to the aspect, a structural rigidity of the first bulkhead is less than a structural rigidity of the second bulkhead, and a structural rigidity of the third bulkhead is greater than that of the second bulkhead.

According to the aspect, the first bulkhead has a first length, the second bulkhead has a second length, and the third bulkhead has a third length, and the first length is less than the second length, and the second length is less than the third length.

According to the aspect, each of the first bulkhead and the second bulkhead include a panel extending between the inner panel and the outer panel, and the panel includes a first flange attached to the inner panel and a second flange attached to the outer panel.

According to the aspect, the third bulkhead includes a pair of panels that extend between the inner panel and the outer panel that are connected by a web that is attached to the inner panel, and the pair of panels each include a flange opposite to the web that is attached to the outer panel.

According to the aspect, the outer panel includes a second bead pattern including a linear bead that is positioned opposite the second vertically extending bead of the inner panel.

According to the aspect, one of the first longitudinally extending rail and the second longitudinally extending rail includes a component mounted thereto, and during the frontal collision event, the locations of the plurality of bulkheads relative to the first, second, and third vertically extending beads cause each of the first and second longitudinally extending rails to deform in a controlled manner that maintains a distance between the component attached to the one of the first and second longitudinally extending rails and the high-voltage component.

According to the aspect, the component is a pump assembly.

According to the aspect, the vehicle may further include a protection shield attached to electric drive motor, and configured to shield the high-voltage component from the component during the frontal impact.

According to the aspect, the first bead patterns are provided on sides of the inner panels of the first and second longitudinally extending rails that face the electric drive motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
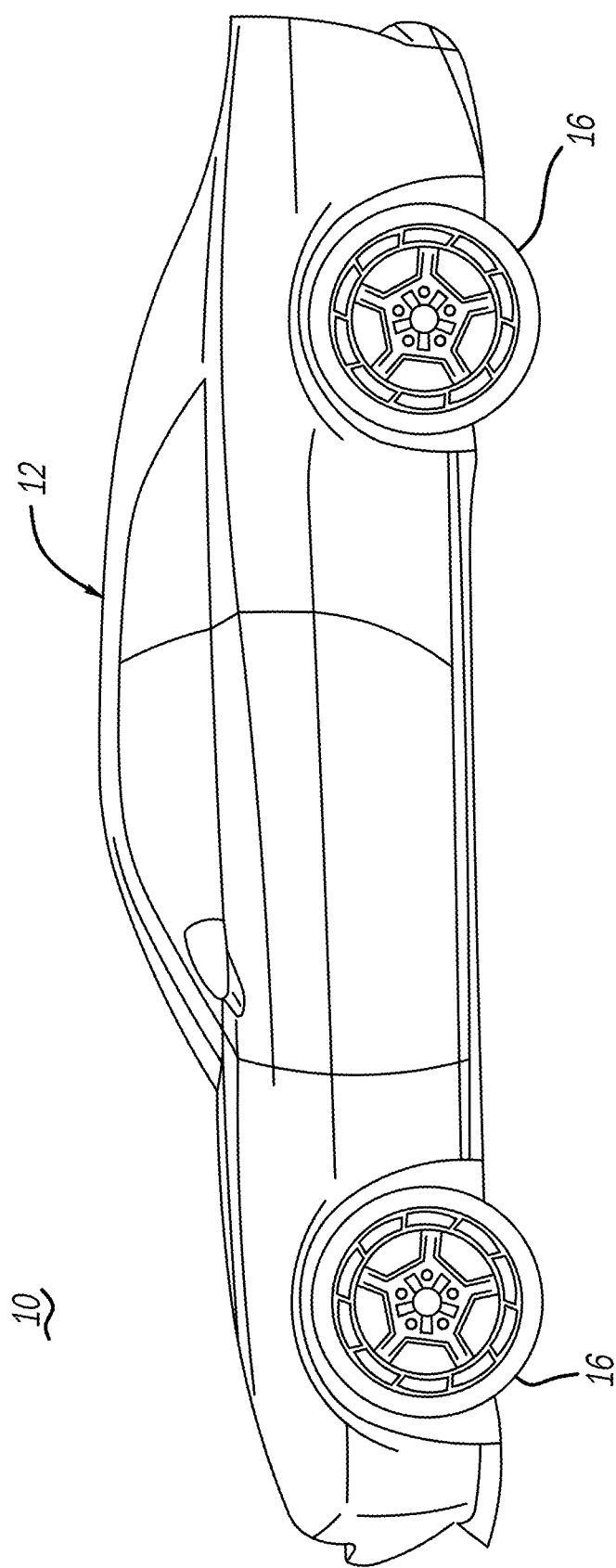
FIG. 1 is a side-perspective view of an example vehicle according to a principle of the present disclosure.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an example vehicle 10 according to a principle of the present disclosure. Vehicle 10 includes a body 12 attached to a vehicle frame 14 (FIG. 2), and a plurality of wheels 16.

Figure 2:
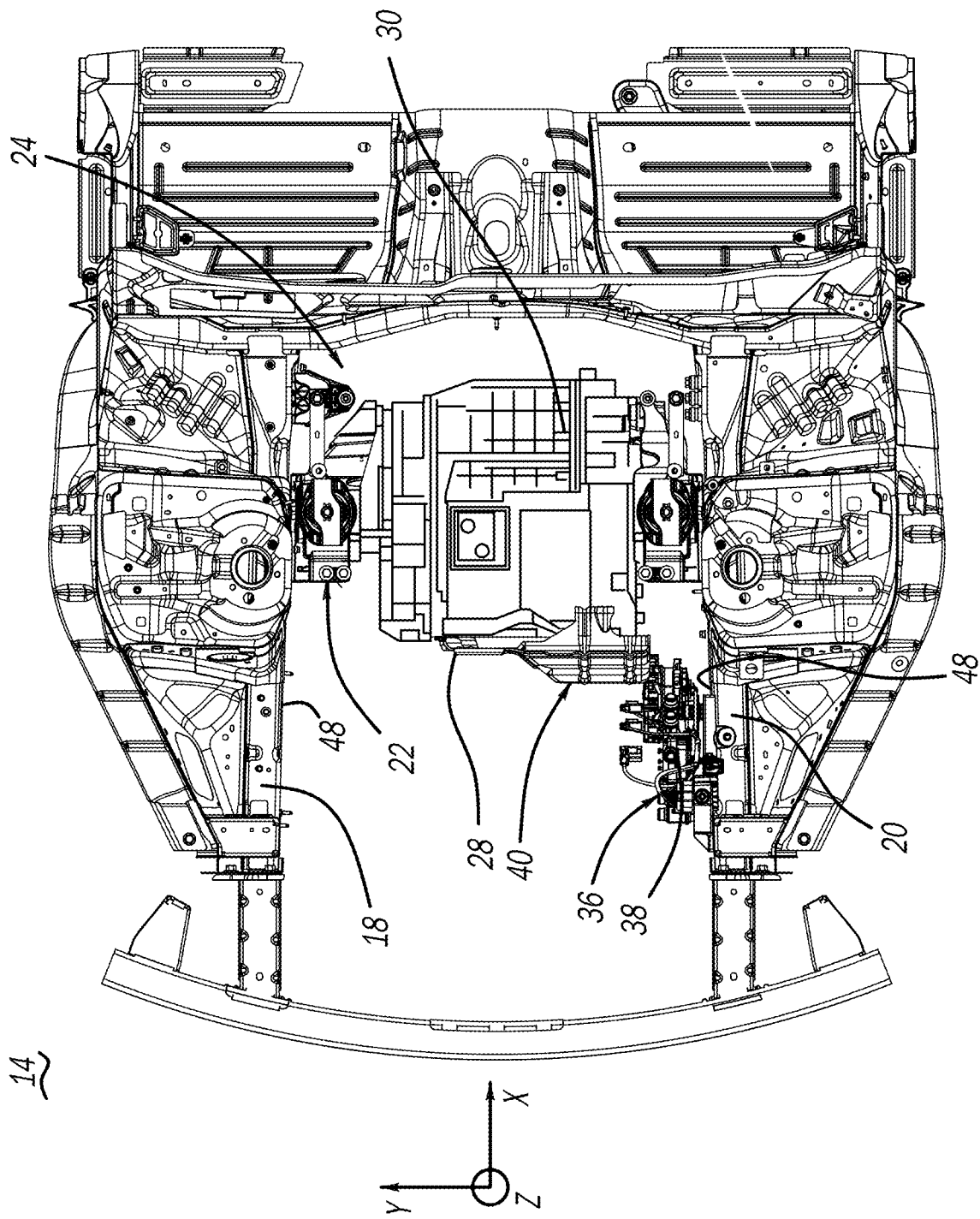
FIG. 2 is an overhead perspective view of a portion of a frame supporting a propulsion system of the vehicle illustrated in FIG. 1.

Now referring to FIG. 2, it can be seen that vehicle frame 14 includes first and second longitudinally extending rails 18, 20 that support a propulsion system 22 of vehicle 10. Rail 18 can be considered a first or right rail and rail 20 can be considered a second or left rail. In the illustrated embodiment, propulsion system 22 is an electric drive module 24 that is positioned between and supported by first and second rails 18, 20. It should be understood, however, that propulsion system 22 may include an internal combustion engine (not shown) without departing from the scope of the present disclosure.

Figure 3:
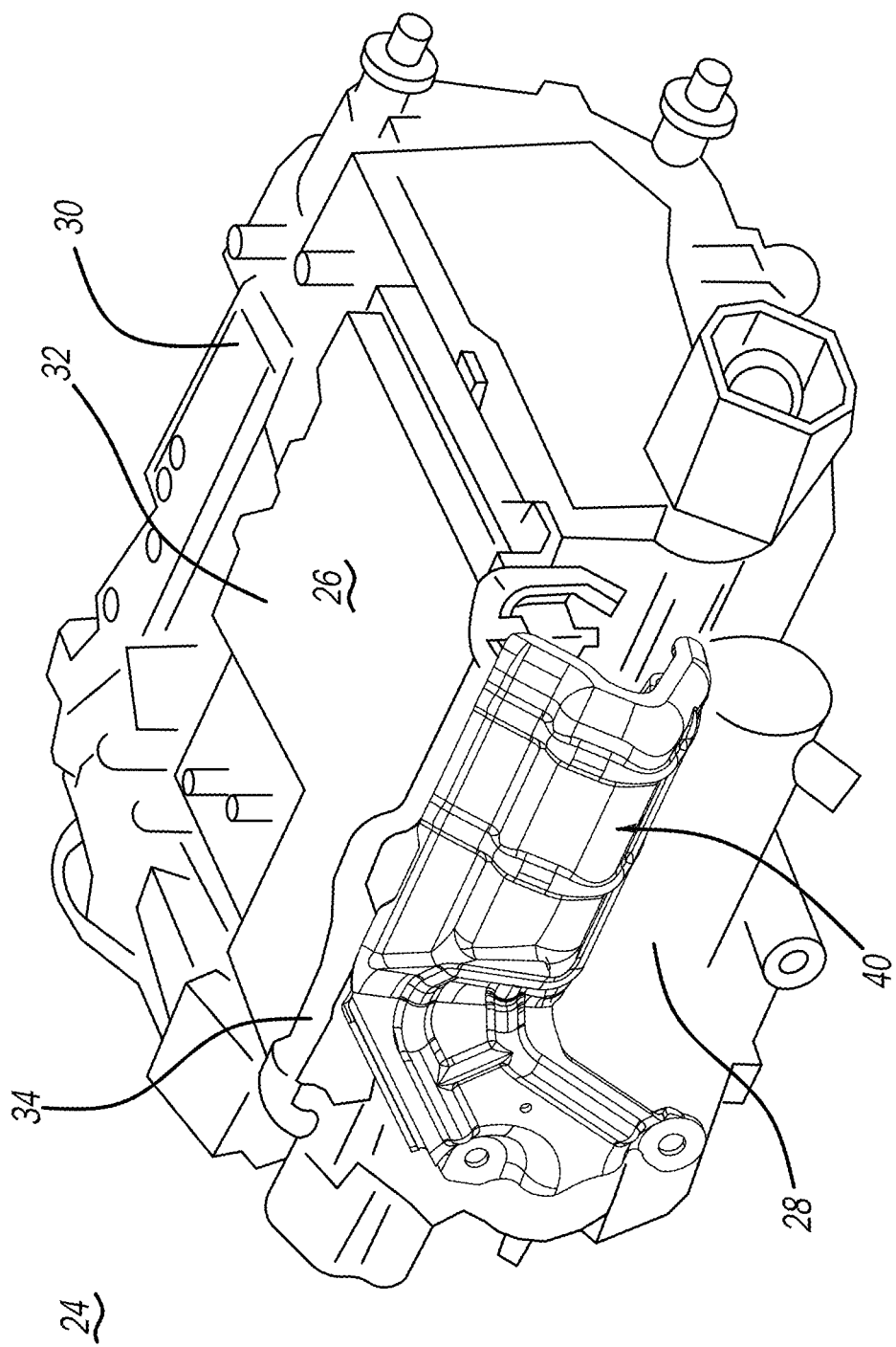
FIG. 3 is an isometric perspective view of the propulsion system illustrated in FIG. 2 having a high-voltage component and high-voltage component protection shield attached thereto.

As best shown in FIG. 3, electric drive motor 24 includes a high-voltage component 26 attached to a forward end 28 on an upper surface 30 of electric drive motor 24. High-voltage component 26 may be, for example, a power inverter device that is configured to convert high-voltage direct current (DC) stored in a battery pack (not shown) of vehicle 10 to a high-voltage three-phase alternating current (AC) that can be used to drive the electric drive motor 24. It should be understood, however, that other high-voltage components 26 are contemplated including but not limited to a power distribution center (PDC), an integrated dual charging module (IDCM), an electric air conditioning compressor (EAC) module, and a park distance control (PDC) module without departing from the scope of the present disclosure.

High-voltage component 26 includes a housing 32 that may be formed of a rigid metal material such as cast aluminum, or may be formed of a polymeric material such as polyamide (e.g., NYLON®) or some other material, and which houses a plurality of high-voltage electrical features (not shown) such as electrical circuits and the like. Inasmuch as high-voltage component 26 is located at forward end 28 of electric drive motor 24 due to packaging restraints of vehicle 10, however, high-voltage component 26 may be at risk to be damaged if vehicle 10 is subjected to a collision event with, for example, another vehicle or another object. That is, if high-voltage component 26 is subjected to contact with another component of vehicle 10 during a collision event, housing 32 may crack and expose the high-voltage electrical features, which is undesirable.

Moreover, if cracks or sharp edges develop in housing 32 as a result of the collision event, the sharp edges may contact other high-voltage features of electric drive motor 24 such as high-voltage cables 34 that are positioned near high-voltage component 26, which can cut or sever the cables 34. This is undesirable from the standpoint that any damage to a high-voltage component 26 or cables 34 can cause a short in the electric system that can result in loss of high-voltage isolation and prevent shutdown of the battery (not shown).

For example, again referring to FIG. 2, it can be seen that first and second rails 18 and 20 can be used to support other features of vehicle 10 including, but not limited to, a pump assembly 36 having a rigid (e.g., metal) shell 38 that includes various pumps (not shown) and sensors (not shown). As shown in FIG. 2, because pump assembly 36 is located forward of electric drive motor 24, it is possible for pump assembly 36 to be forced in a rearward direction (i.e., back toward electric drive motor 24) if vehicle 10 is subjected to a frontal collision with another vehicle or an object. If pump assembly 36 is forced back with enough force that pump assembly 36 contacts high-voltage component 26, the contact between pump assembly 36 and high-voltage component 26 may, as noted above, cause housing 32 of high-voltage component 26 to crack, which is undesirable. Accordingly, as shown in FIGS. 2 and 3, vehicle 10 may be provided with a protection shield 40 attached to electric drive motor 24 that can provide protection for high-voltage component 26 from contact by pump assembly 36 or another component of vehicle 10 located proximate to high-voltage component 26.

While it may be desirable for vehicle 10 to include protection shield 40 to provide protection for high-voltage component 26, it is also desirable to design first and second rails 18 and 20 to deform in a collision event in a manner that further protection is provided to electric drive module 24 and high-voltage component 26. This may be accomplished, with reference to FIGS. 4 to 12, by providing the first and second rails 18, 20 with a bead arrangement 42a, 42b and structural features (i.e., bulkheads 44 and reinforcement baffle 46) that increase the structural rigidity of the first and second rails 18 and 20, while also influencing the deformation characteristics of the first and second rails 18 and 20.

Figure 4:
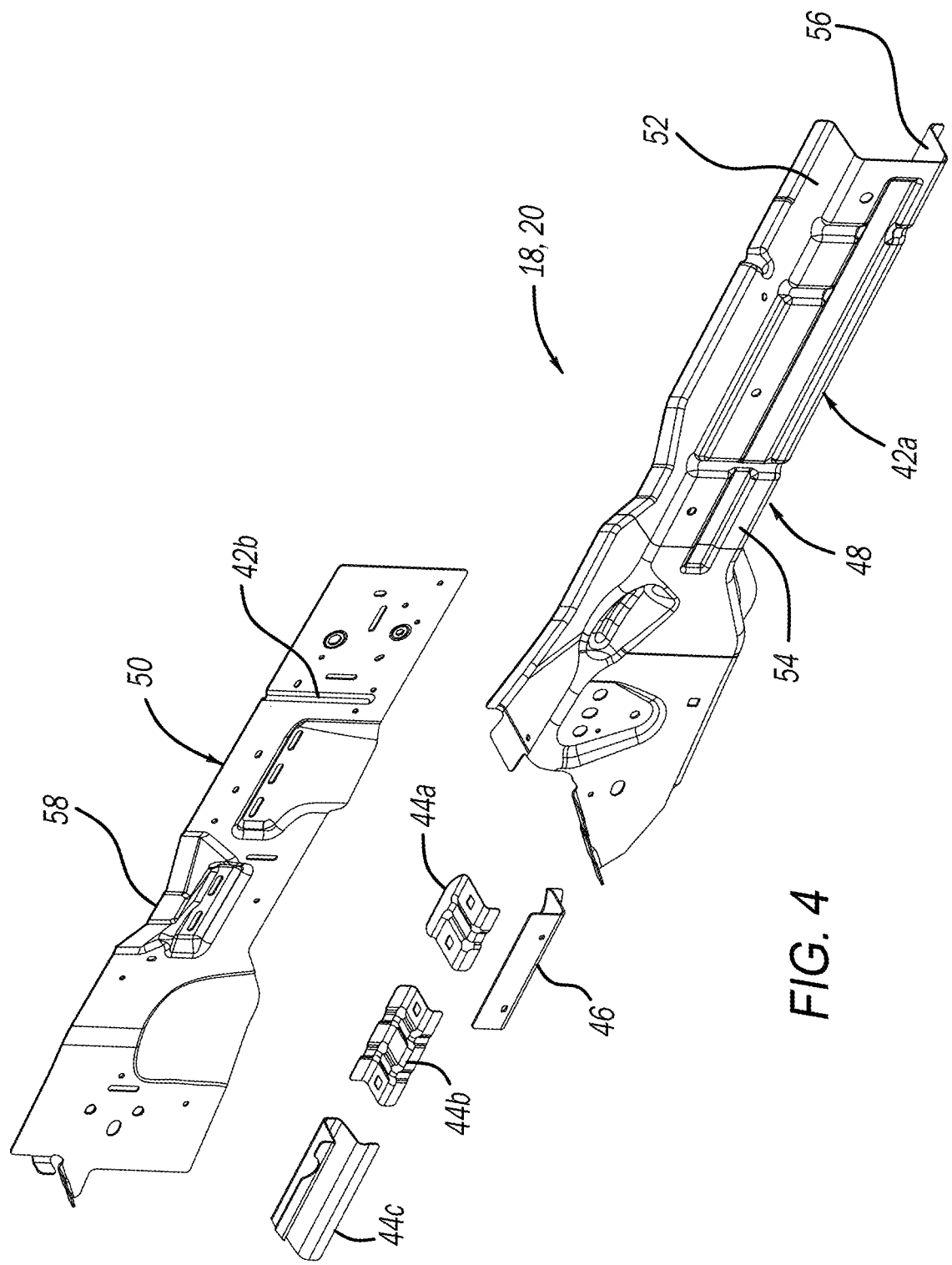
FIG. 4 is an exploded perspective view of one of the longitudinally extending rails of the frame illustrated in FIG. 2.

Referring to FIGS. 2 and 4-7, it can be seen that each of the first rail 18 and second rail 20 include an inner panel 48 that faces electric drive motor 24 and an outer panel 50 that faces away from electric drive motor 24. Inner panel 48 defines an upper surface 52, an inner side surface 54, and a bottom surface 56 of each of the first and second rails 18, 20. Outer panel 50 defines an outer side surface 58 of each of the first and second rails 18, 20. The bead arrangement 42a of each rail 18, 20 is provided on the inner side surfaces 54 of inner panel 48 that face the electric drive module 24. The bead arrangement 42b is provided in outer panel 50 (FIG. 4). By providing bead arrangements 42a and 42b on inner panel 48 and outer panel 50 of the first and second rails 18 and 20, the first and second rails 18 and 20 are designed to deform in a more controlled manner not only when vehicle 10 is subjected to a direct frontal collision (see, e.g., FIGS. 13 and 14), but also in a more controlled manner when subjected to angular impacts from the left and right sides of vehicle 10, respectively.

Figure 5:
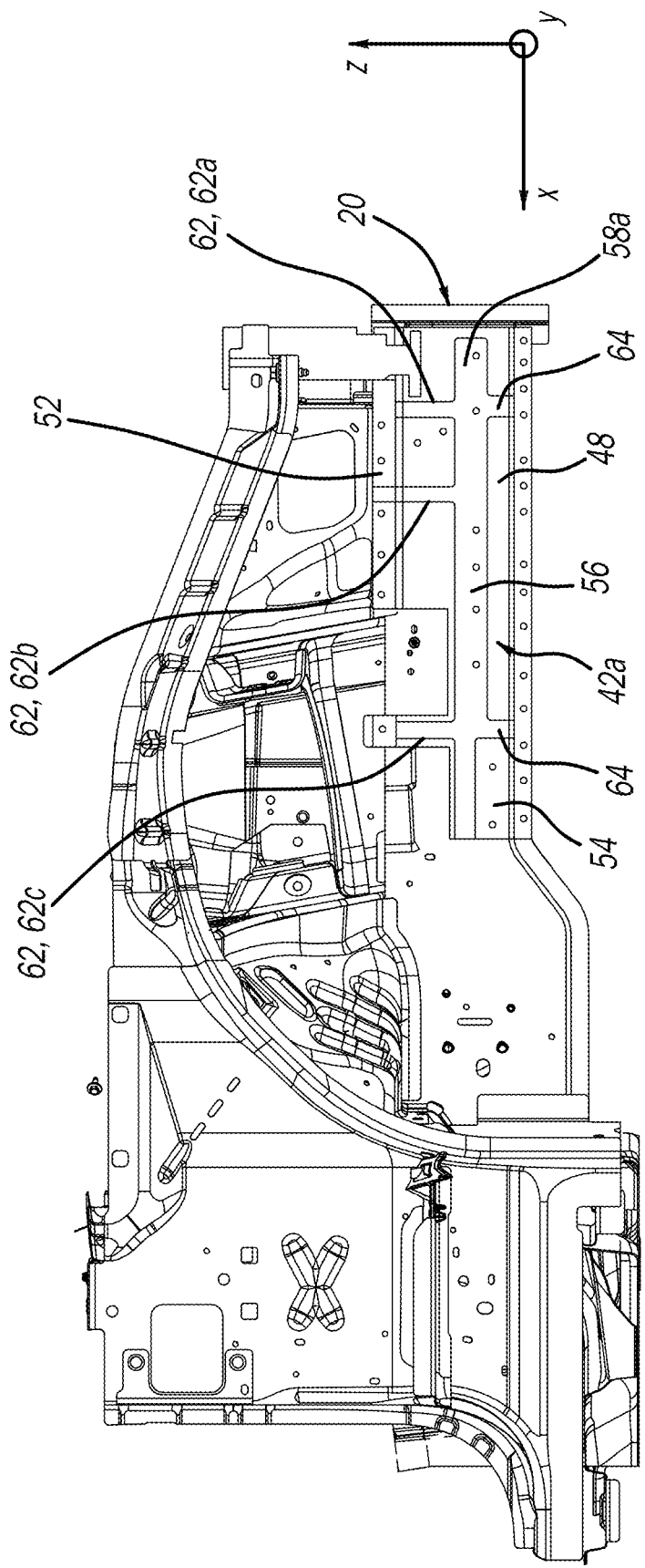
FIG. 5 is side perspective views of one of the longitudinally extending rails of the frame illustrated in FIG. 2.
Figure 6:
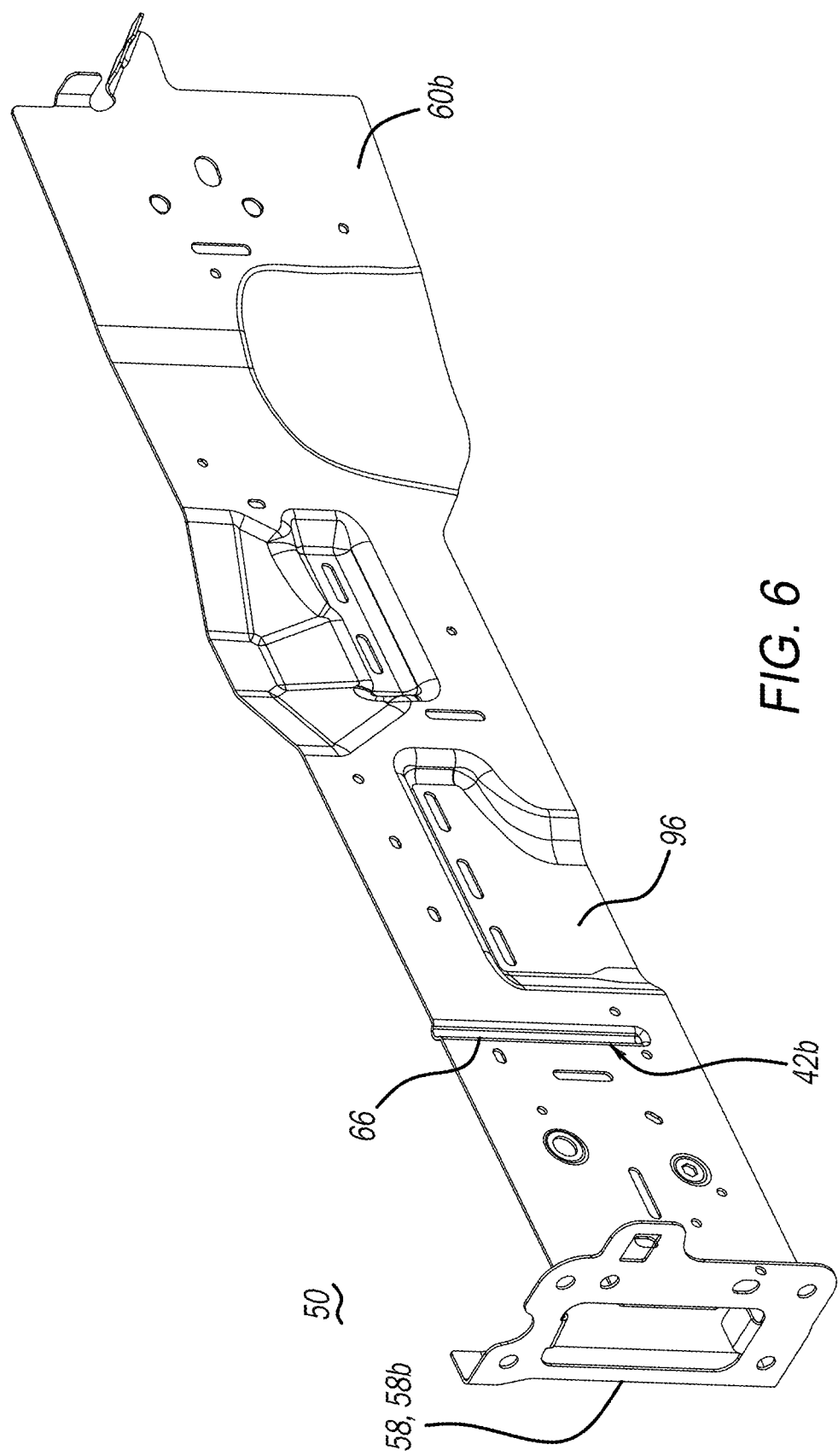
FIG. 6 is a perspective view of an interior surface of an outer panel of longitudinally extending rail illustrated in FIG. 5.
Figure 7:
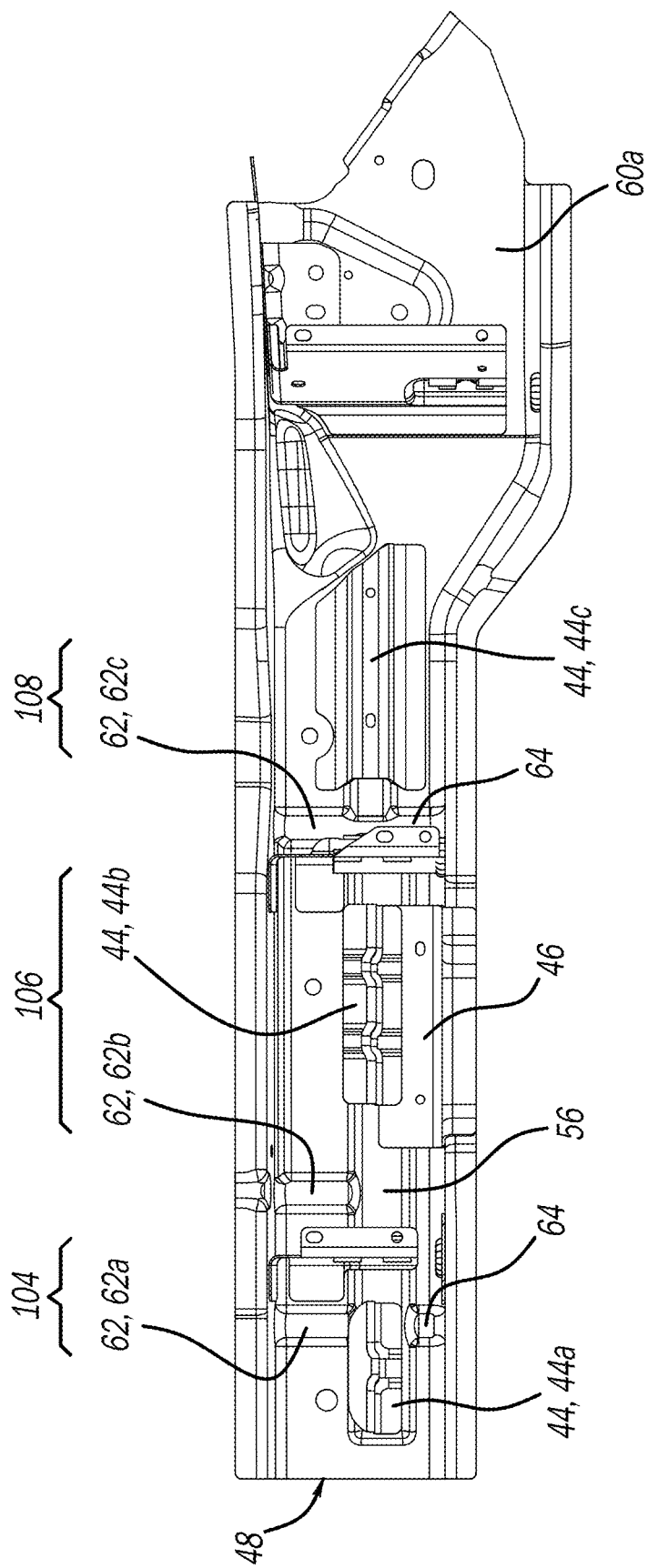
FIG. 7 is a perspective view of an interior surface of an inner panel of the longitudinally extending rail illustrated in FIG. 5 having a plurality of bulkheads and a reinforcement baffle attached thereto.

Referring to FIGS. 5 and 7, each bead pattern 42a includes a longitudinally extending bead 56 that extends in parallel with a longitudinal axis (x-axis) of vehicle 10. Longitudinally extending bead 56 may be in the form of a recess (as illustrated) that is recessed relative to an exterior surface 58a of inner panel 48 of the respective rail 18 or 20, or may be in the form of a protrusion (not shown) that extends outward from the exterior surface 58a of inner panel 48 In the illustrated embodiment, longitudinally extending bead 56 is in the form of a recess because various additional structural features (e.g., bulkheads 44 and reinforcement baffle 46, FIG. 7) of the first and second rails 18 and 20 may be located within an interior of the rail 18 or 20 that are welded to an interior surface 60a of the inner panel 48 at longitudinally extending bead 56, as will be described in more detail later. Regardless whether longitudinally extending bead 56 is in the form of a recess or a protrusion, it should be understood that longitudinally extending bead 56 increases the structural rigidity of the first and second rails 18, 20.

Figure 13:
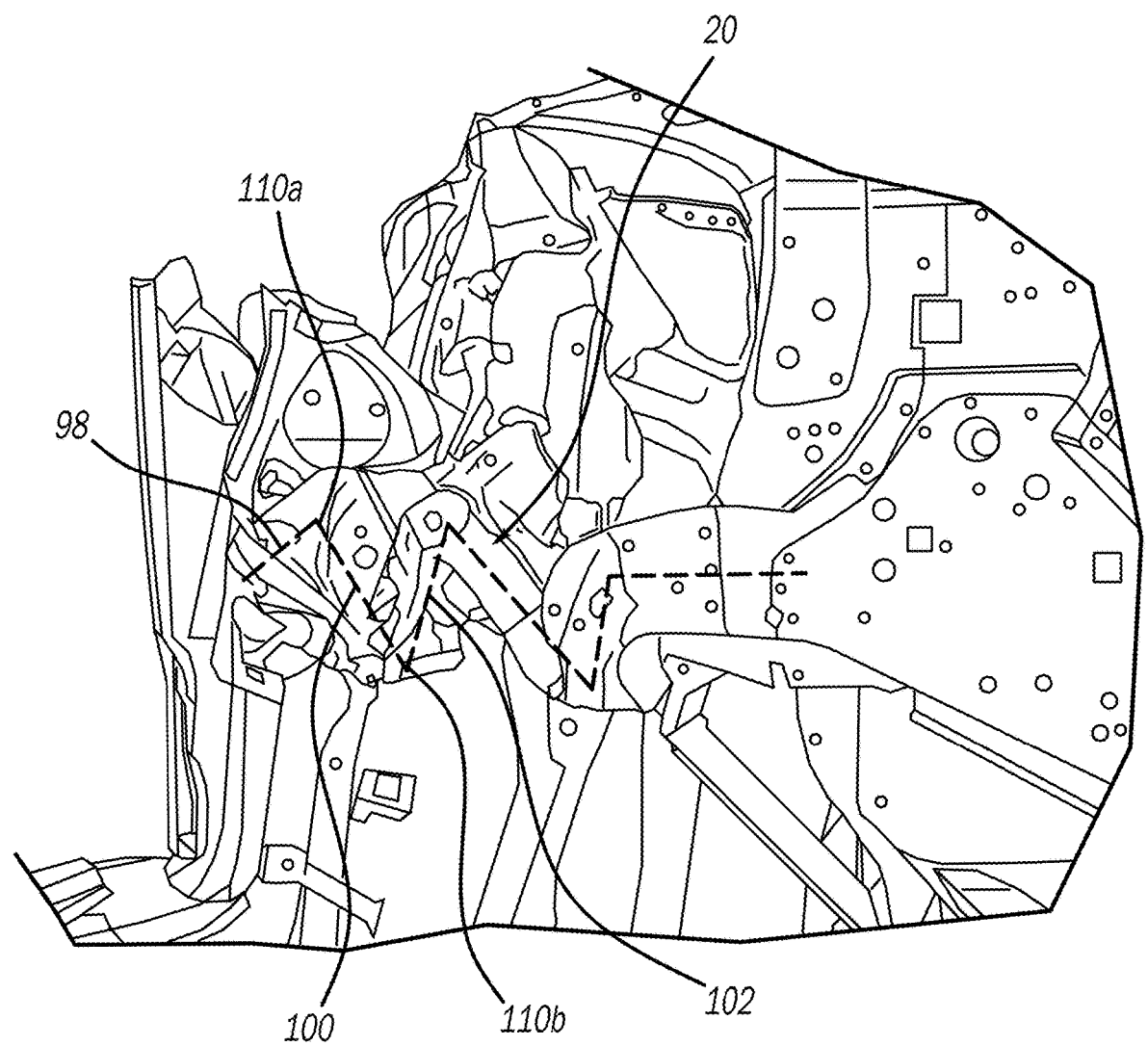
FIG. 13 is a partial underneath perspective view of the frame illustrated in FIG. 2 after having been subjected to a direct frontal impact.
Figure 14:
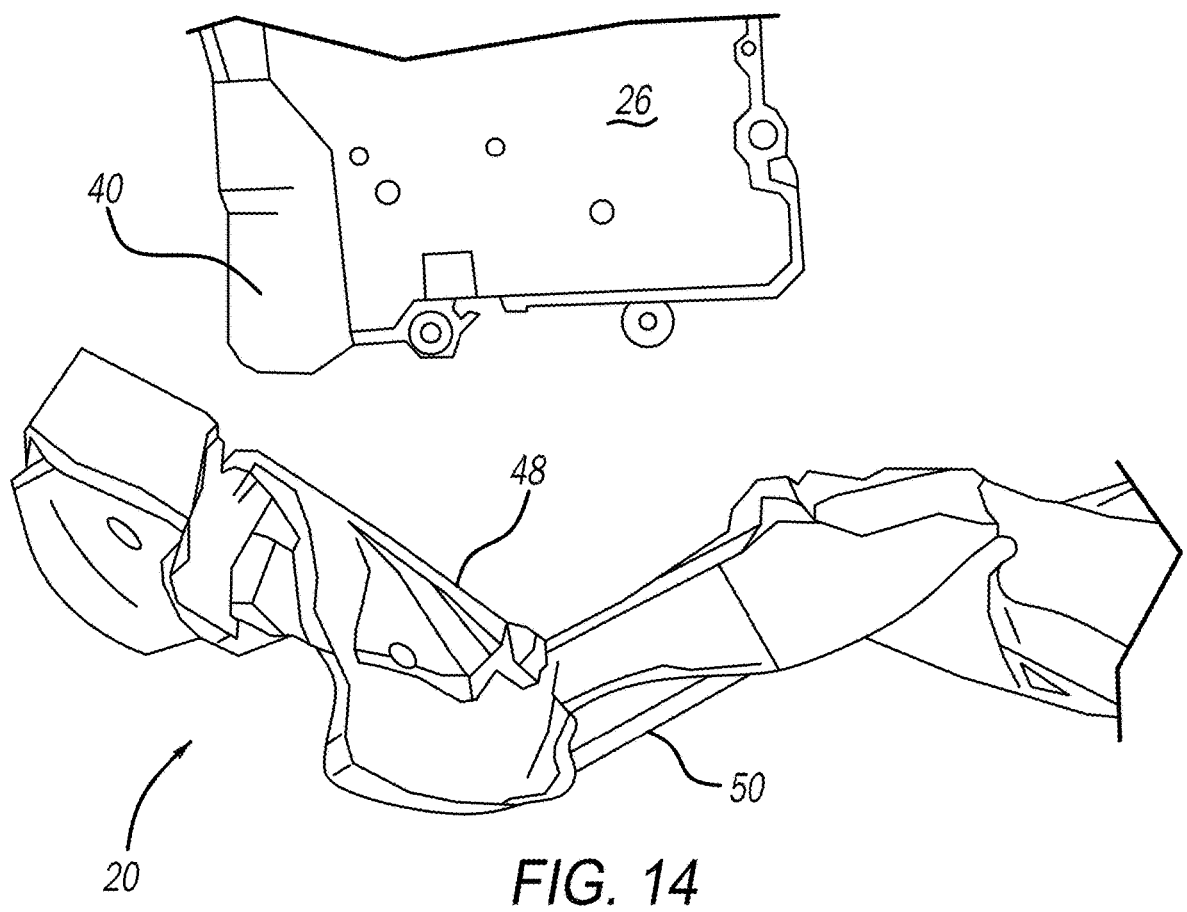
FIG. 14 is a partial overhead perspective view of the frame illustrated in FIG. 2 after having been subjected to a direct frontal impact.

In addition, each bead pattern 42a includes a plurality of vertically upwards extending beads 62 and vertically downwardly extending beads 64 at various locations along a length longitudinally extending bead 56. Vertically upward and downward extending beads 62, 64, like longitudinally extending bead 56, also provide increased rigidity to first and second rails 18, 20. It should be understood, however, that the vertically upward and downward extending beads 62 and 64 are configured to act like hinges during a collision event that permit the first and second rails 18 and 20 to crumple in a designed pattern (e.g., zig-zag pattern) as shown in FIGS. 13 and 14, as will be described in more detail later.

Bead pattern 42b is provided in outer panel 50, and in the illustrated embodiment includes a linear bead 66 that extends in the z-direction (i.e., upward direction). Similar to inner panel 48, outer panel 50 includes an exterior surface 58b and an interior surface 60b. Linear bead 66 may be in the form of a protrusion that protrudes outward from exterior surface 58b, but may be a recess if desired. Similar to vertically upward and downward beads 62 and 64, linear bead 66 may function as a hinge that permits outer panel 50 to crumple during a collision event in a designed manner (FIGS. 13 and 14). While only a single linear bead 66 is illustrated, it should be understood that outer panel 50 may have a plurality of linear beads 66 at locations that correspond (i.e., are opposed to) the vertically upward and downward beads 62 and 64 of inner panel 48.

In addition to bead patterns 42a and 42b assisting in first and second rails 18 and 20 crumpling in a designed pattern, first and second rails 18 and 20 also include interior components such as bulk heads 44 and reinforcement baffle 46 that provide structural rigidity to first and second rails 18 and 20. Bulk heads 44 and reinforcement baffles 46 are located within first and second rails 18 and 20 at selected locations that in combination with bead patterns 42a and 42b, assist the first and second rails 18 and 20 in crumpling in the designed patterns shown in FIGS. 13 and 14.

Figure 8:
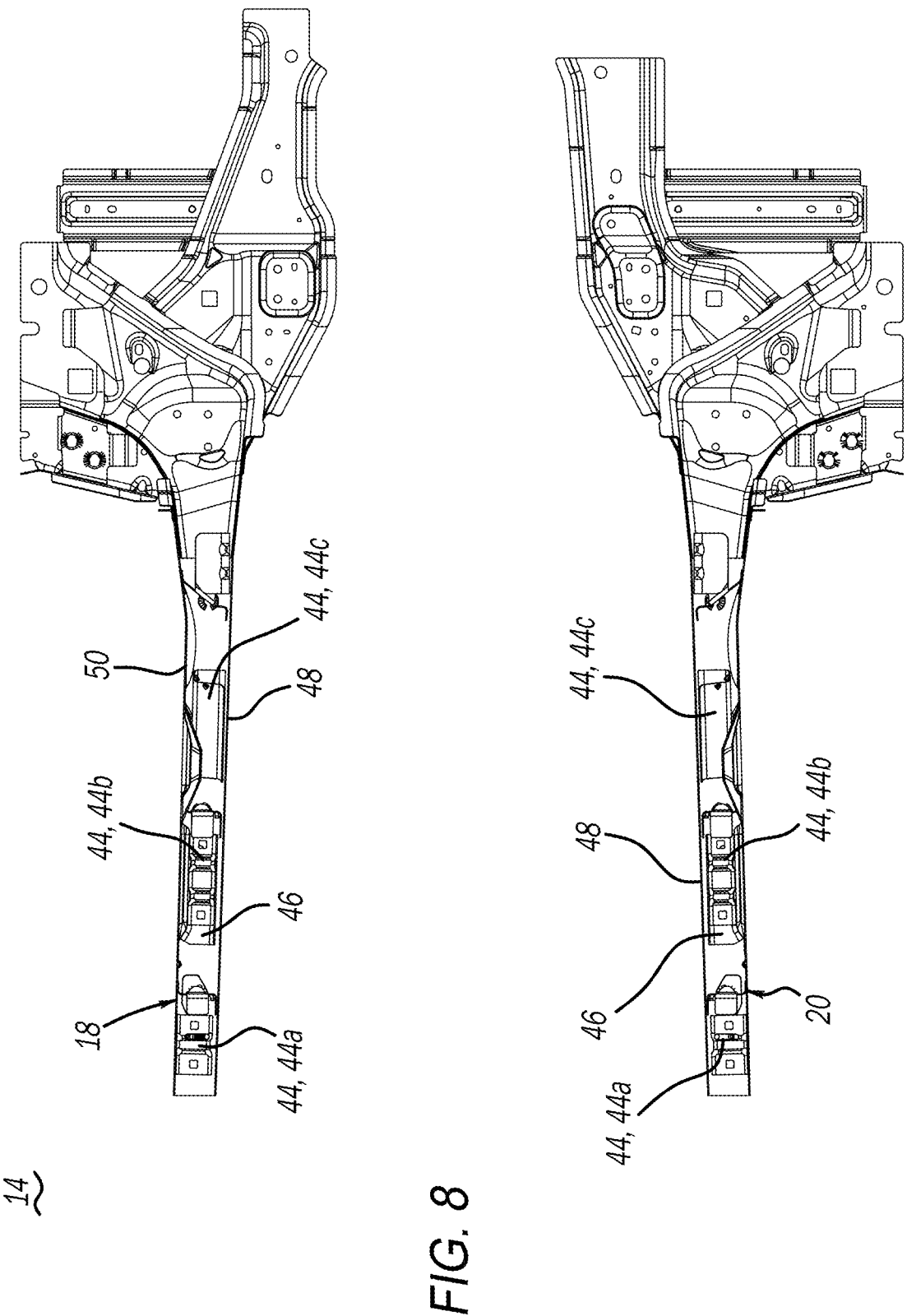
FIG. 8 is an x-y plane cross-sectional view the vehicle frame illustrated in FIG. 2.

Bulk heads 44 include a first bulk head 44a, a second bulk head 44b, and a third bulk head 44c. The locations of the bulk heads 44 relative to the bead pattern 42a are best shown in FIG. 7, and the locations of bulk heads 44 between the inner and outer panels 48 and 50 within the interior of the first and second rails 18 and 20 are best shown in FIG. 8. First bulk head 44a at least partially overlaps in the x-direction a first 62a of the vertically upward extending beads 62 and a first 64a of the vertically downward extending beads 64, and overlaps a forward portion 56a of the longitudinally extending bead 56. Second bulk head 44b is positioned between a second 62b of the vertically upward extending beads 62 and a third 62c of vertically upward extending beads 62, and overlaps a middle portion 56b of the longitudinally extending bead 56. Third bulk head 44c is located aft of the third 62c vertically upward extending beads 62, and overlaps a tail portion 56c of the longitudinally extending bead 56.

Figure 9:
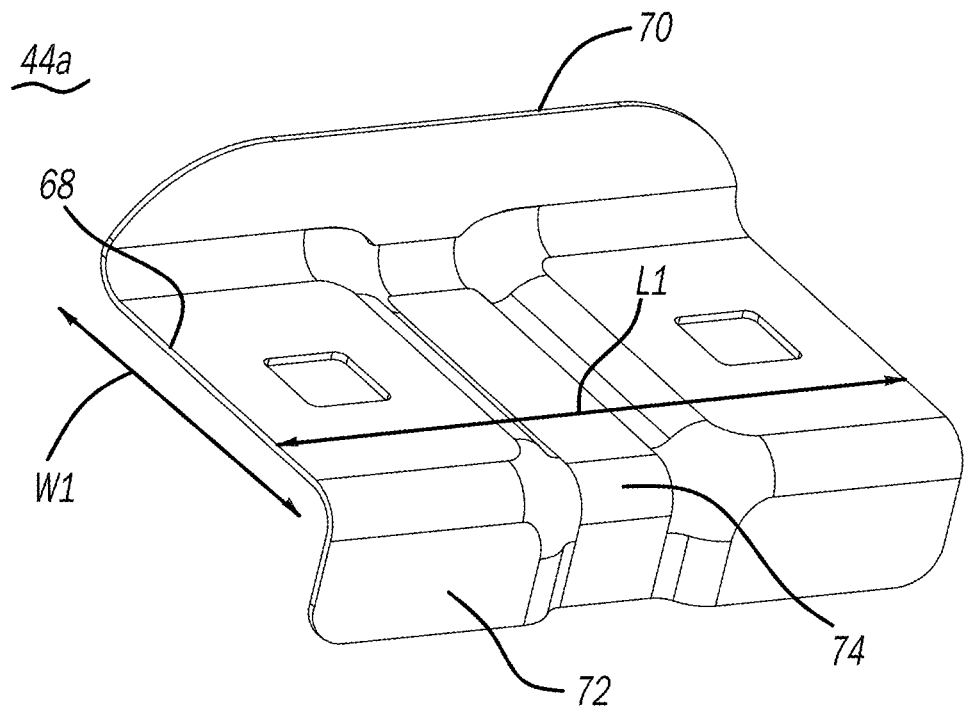
FIG. 9 is an isometric perspective view of a first bulkhead.

First bulk head 44a is best shown in FIG. 9 and includes a first panel 68 having a length L1 in the x-direction and a width W1 in the y-direction. First panel 68 includes a first flange 70 configured to be attached (e.g., welded) to the interior surface 60a of inner panel 48 and a second flange 72 configured to be attached (e.g., welded) to the interior surface 60b of outer panel 50. A first strengthening rib 74 may be provided in first panel 68 that extends between the first and second flanges 70 and 72.

Figure 10:
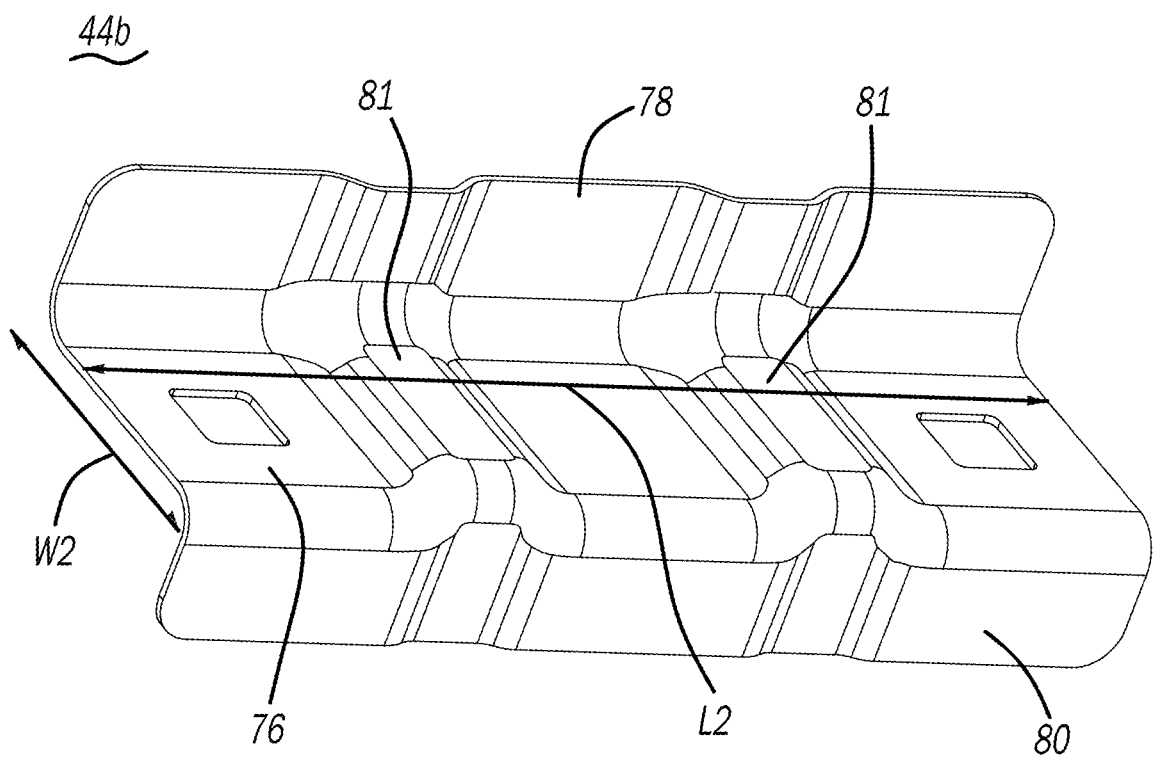
FIG. 10 is an isometric perspective view of a second bulkhead.

Second bulk head 44b is best shown in FIG. 10 and includes a second panel 76 having a length L2 in the x-direction and a width W2 in the y-direction. The length L2 is greater than the length L1 of first bulk head 44a. Similar to first bulk head 44a, the second panel 76 of second bulk head 44b includes a third flange 78 configured to be attached (e.g., welded) to the interior surface 60a of inner panel 48 and a fourth flange 80 configured to be attached (e.g., welded) to the interior surface 60b of outer panel 50. A pair of second strengthening ribs 81 may be provided in second panel 76 that extends between the first and second flanges 70 and 72. A rigidity of second bulk head 44b is greater than that of first bulk head 44a because second bulk head 44b has the length L2 that is greater than the length L1 of first bulk head 44a, and because second bulk head 44b includes a pair of second strengthening ribs 80 in comparison to a single first strengthening rib 74 of first bulk head 44a.

Figure 11:
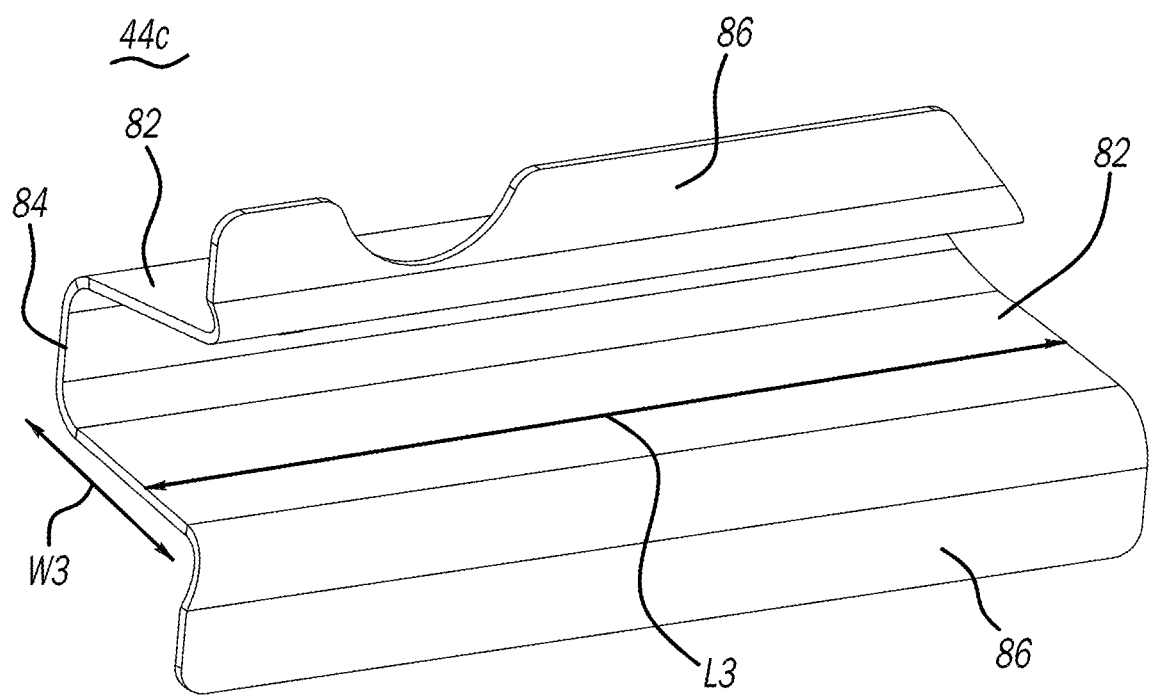
FIG. 11 is an isometric perspective view of a third bulkhead.

Third bulk head 44c is best shown in FIG. 11, and is designed to be the most rigid of the first, second and third bulk heads 44a-44c. In this regard, third bulk head 44c includes a pair of third panels 82 that each having a length L3 in the x-direction that is greater than the lengths L1 and L2 of the first and second bulk heads 44a and 44b, respectively. Third panels 82 also have a width W3 in the y-direction. The pair of third panels 82 are connected by a web 84 that is configured to be attached (e.g., welded) to the interior surface 60a of inner panel 48. Each of the third panels 82 also include a fourth flange 86 that are configured to be attached (e.g., welded) to the interior surface 60b of outer panel 50.

Figure 12:
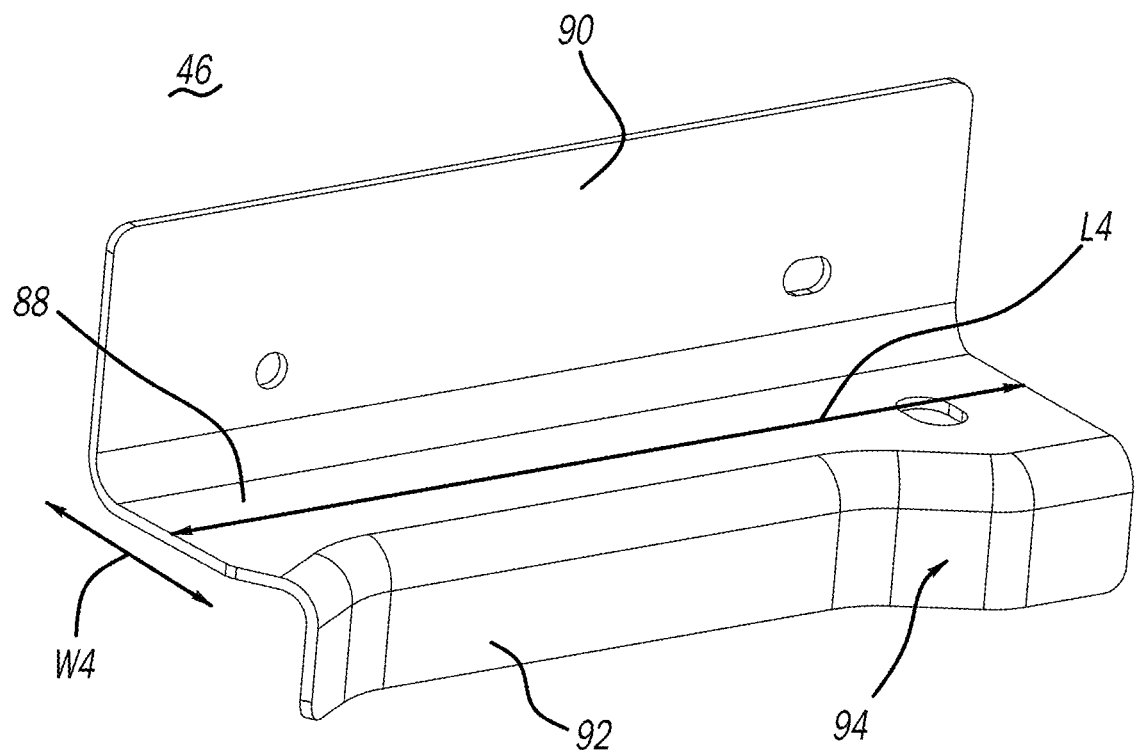
FIG. 12 is an isometric perspective view of a structural baffle.

First and second rails 18 and 20 may also include an optional reinforcement baffle 46 (FIG. 12). For example, the second rail 20 that supports the pump assembly 36 may be selected to include the reinforcement baffle 46 to further increase the rigidity of the second rail 20 to further assist in preventing the pump assembly 36 from being driven backward in a direction toward the high-voltage component 26 attached to electric drive module 24. Alternatively, as shown in FIG. 8, each of the first and second rails 18 and 20 can include the reinforcement baffle 46. In either case, reinforcement baffle 46 may be positioned between the second 62b of the vertically upward extending beads 62 and the third 62c of vertically upward extending beads 62, and overlap a middle portion 56b of the longitudinally extending bead 56 (FIG. 7). Reinforcement baffle 46 includes a fourth panel 88 having a length L4 in the x-direction and a width W4 in the y-direction. The length L4 may be greater than the length L2 of second bulk head 44b. Similar to first bulk head 44a and second bulk head 44b, the fourth panel 88 of includes a fifth flange 90 configured to be attached (e.g., welded) to the interior surface 60a of inner panel 48 and a sixth flange 92 configured to be attached (e.g., welded) to the interior surface 60b of outer panel 50. Sixth flange 92 may have a contour 94 that matches that of a pocket 96 (FIG. 6) that is provided on outer panel 50.

Now referring to FIG. 13, the deformation of the first and second rails 18 and 20 will be described during a frontal collision event. As can be seen in FIG. 13, which is a view from underneath the vehicle 10, the rail 20 has deformed in a zig-zag pattern. Specifically, the rail 20 has deformed in a manner where a first section 98 is angled relative to a second section 100, the second section 100 is angled relative to a third section 102 in an accordion-like manner. Again referring to FIG. 7, the first section 98 corresponds to a first portion 104 of the rail 20 that includes the first bulk head 44a, the second section 100 corresponds to a second portion 106 of the rail 20 that includes the second bulk head 44b and reinforcement panel 46, and the third section 102 corresponds to a third portion 108 of the rail 20 that includes the third bulk head 44c. The apexes 110a and 110b between the first and second sections 98 and 100 and the second and third sections 100 and 102, respectively, correspond to locations of the first 62a and second 62b vertically extending beads 62. Thus, the use of the reinforcement structures 44 and 46 within rails 18 and 20 that include the bead patterns 42a and 42b permit the rails 18 and 20 to crumple in a desired zig-zag pattern.

Figure 15:
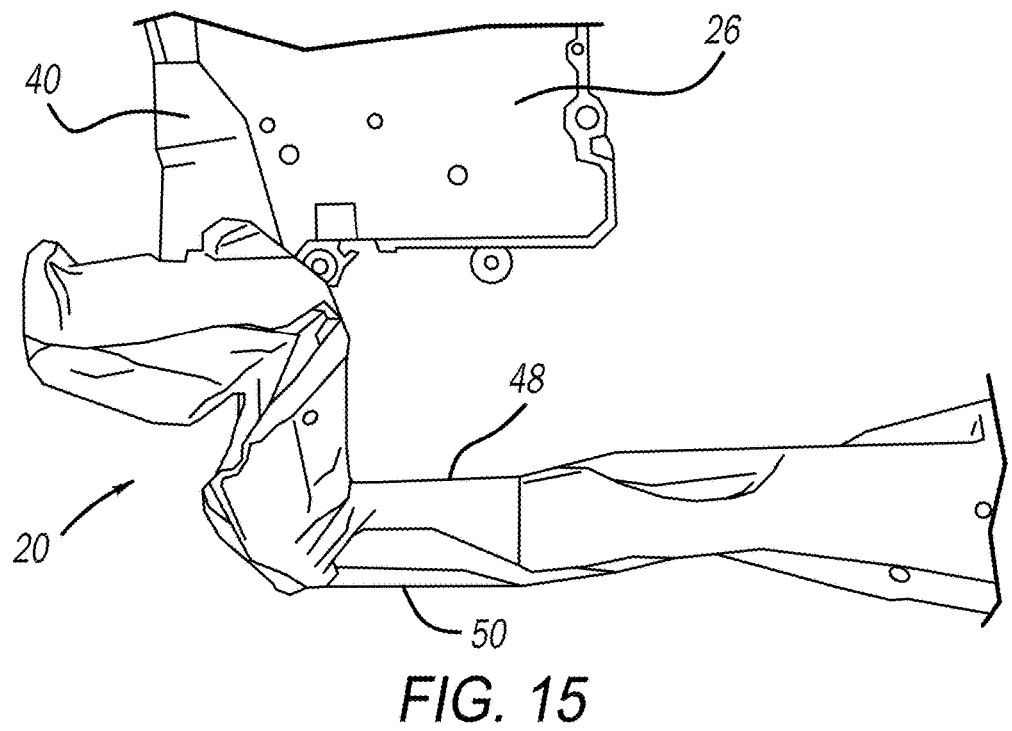
FIG. 15 is a partial overhead perspective view of a frame that does not include a bead arrangement, the bulkheads, or the structural baffles illustrated in FIG. 7 after having been subjected to a direct frontal impact.

As can be seen in FIG. 14, when the rails 18 and 20 include the bead patterns 42a and 42b and structural reinforcement features 44 and 46, the rails 18 and 20 crumple in the desired controlled zig-zag manner that maintains a distance between the rails 18 and 20 and the high voltage component 26, which protects the high voltage component 26 from damage during a collision event. As shown in FIG. 15, when the rails 18 and 20 do not include the bead patterns 42a and 42b and structural reinforcement features 44 and 46, the rails 18 and 20 crumple in an uncontrolled manner that may cause the rails 18 and 20 to crumple in a direction toward the high-voltage component 26, which can damage the high voltage component 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a frame supporting an electric drive motor; and
   a high-voltage component attached to a forward end and upper surface of the electric drive motor;
   wherein the frame includes a first longitudinally extending rail and a second longitudinally extending rail, each of the first and second longitudinally extending rails including an inner panel attached to an outer panel;
   a plurality of bulkheads are positioned within each of the first and second longitudinally extending rails between the inner panel and the outer panel;
   the inner panels of each of first and second longitudinally extending rails each include a first bead pattern that limits deformation of the respective rail during a frontal impact to the vehicle, each of the first bead patterns including a longitudinally extending bead, a first vertically extending bead connected to the longitudinally extending bead, a second vertically extending bead connected to the longitudinally extending bead, and a third vertically extending bead connected to the longitudinally extending bead;
   the plurality of bulkheads includes a first bulkhead positioned between the inner panel and the outer panel at a location positioned forward of first vertically extending bead, a second bulkhead positioned between the inner and outer panel at a location positioned between the first and second vertically extending beads, and a third bulkhead positioned between the inner panel and the outer panel at a location positioned aft of the third vertically extending bead; and
   during a frontal collision event, the locations of the plurality of bulkheads relative to the first, second, and third vertically extending beads cause each of the first and second longitudinally extending rails to deform in a controlled manner that maintains a distance between the first and second longitudinally extending rails and the high-voltage component.

2. The vehicle according to claim 1, wherein each of the first and second longitudinally extending rails includes a reinforcement baffle positioned between the inner panel and the outer panel at a location positioned between the first and second vertically extending beads and proximate the second bulkhead.

3. The vehicle according to claim 1, wherein a structural rigidity of the first bulkhead is less than a structural rigidity of the second bulkhead, and a structural rigidity of the third bulkhead is greater than that of the second bulkhead.

4. The vehicle according to claim 3, wherein the first bulkhead has a first length, the second bulkhead has a second length, and the third bulkhead has a third length, and
   the first length is less than the second length, and the second length is less than the third length.

5. The vehicle according to claim 4, wherein each of the first bulkhead and the second bulkhead include a panel extending between the inner panel and the outer panel, and the panel includes a first flange attached to the inner panel and a second flange attached to the outer panel.

6. The vehicle according to claim 4, wherein the third bulkhead includes a pair of panels that extend between the inner panel and the outer panel that are connected by a web that is attached to the inner panel, and the pair of panels each include a flange opposite to the web that is attached to the outer panel.

7. The vehicle according to claim 1, wherein the outer panel includes a second bead pattern including a linear bead that is positioned opposite the second vertically extending bead of the inner panel.

8. The vehicle according to claim 1, wherein one of the first longitudinally extending rail and the second longitudinally extending rail includes a component mounted thereto, and
   during the frontal collision event, the locations of the plurality of bulkheads relative to the first, second, and third vertically extending beads cause each of the first and second longitudinally extending rails to deform in a controlled manner that maintains a distance between the component attached to the one of the first and second longitudinally extending rails and the high-voltage component.

9. The vehicle according to claim 8, wherein the component is a pump assembly.

10. The vehicle according to claim 1, further comprising a protection shield attached to the electric drive motor, and configured to shield the high-voltage component from the component during the frontal impact.

11. The vehicle according to claim 1, wherein the first bead patterns are provided on sides of the inner panels of the first and second longitudinally extending rails that face the electric drive motor.

* * * * *